US012779973B2

(12) United States Patent
Kim et al.

(10) Patent No.: US 12,779,973 B2
(45) Date of Patent: Nov. 3, 2026

(54) STRUCTURE FOR PROTECTING BATTERY FOR VEHICLE AND VEHICLE INCLUDING THE SAME

(71) Applicants: Hyundai Motor Company, Seoul (KR); Kia Corporation, Seoul (KR)

(72) Inventors: Jung Ki Kim, Hwaseong-si (KR); Jun Hyoung Kim, Hwaseong-si (KR); Sun Ki Choi, Hwaseong-si (KR); Soo Kyung Han, Hwaseong-si (KR); Won Gun Kim, Hwaseong-si (KR); Min Cheol Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 210 days.

(21) Appl. No.: 18/939,954

(22) Filed: Nov. 7, 2024

(65) Prior Publication Data

US 2026/0008330 A1 Jan. 8, 2026

(30) Foreign Application Priority Data

Jul. 5, 2024 (KR) ........................ 10-2024-0089130

(51) Int. Cl.

| | |
|---|---|
| ***B60K 1/04*** | (2019.01) |
| ***B62D 21/03*** | (2006.01) |
| ***B62D 21/15*** | (2006.01) |
| ***B62D 25/02*** | (2006.01) |
| ***B62D 25/20*** | (2006.01) |
| ***H01M 50/204*** | (2021.01) |
| ***H01M 50/242*** | (2021.01) |

(Continued)

(52) U.S. Cl.

CPC ................ *B60K 1/04* (2013.01); *B62D 21/03* (2013.01); *B62D 21/157* (2013.01); *B62D 25/025* (2013.01); *B62D 25/20* (2013.01); *H01M 50/204* (2021.01); *H01M 50/242* (2021.01); *H01M 50/249* (2021.01); *H01M 50/262* (2021.01); *B60K 2001/0438* (2013.01); *H01M 2220/20* (2013.01)

(58) Field of Classification Search

CPC ............. B60K 1/04; B60K 2001/0438; H01M 50/249; H01M 50/262; H01M 50/242; H01M 50/204; H01M 2220/20; B62D 21/03; B62D 21/157; B62D 25/025; B62D 25/20

See application file for complete search history.

(56) References Cited

U.S. PATENT DOCUMENTS

| | | | | |
|---|---|---|---|---|
| 11,654,974 B2 * | 5/2023 | Choi | .................. | B62D 25/2027 296/193.05 |
| 2017/0305250 A1 * | 10/2017 | Hara | .................. | H01M 50/204 |
| 2019/0359048 A1 * | 11/2019 | Tsuyuzaki | ................ | B60K 1/04 |

(Continued)

*Primary Examiner* — Edwin A Young
(74) *Attorney, Agent, or Firm* — Slater Matsil, LLP

(57) ABSTRACT

A structure for protecting a battery for a vehicle can include a pair of side sills each extending in a longitudinal direction of a vehicle body, and a floor assembly coupled between the pair of side sills. The floor assembly can include a panel that forms a space for mounting a first battery, a first cross member coupled to the panel and having both ends coupled to the pair of side sills in a first direction, and a second cross member having both ends coupled to the pair of side sills in a second direction and spaced apart from the first cross member with the space for mounting the first battery therebetween.

20 Claims, 10 Drawing Sheets

(51) Int. Cl.
*H01M 50/249* (2021.01)
*H01M 50/262* (2021.01)

(56) References Cited

U.S. PATENT DOCUMENTS

| | | | | |
|---|---|---|---|---|
| 2023/0202580 | A1 * | 6/2023 | Jeong | B60K 1/04<br>180/65.1 |
| 2024/0262429 | A1 * | 8/2024 | Murata | B62D 25/025 |

* cited by examiner

STRUCTURE FOR PROTECTING BATTERY FOR VEHICLE AND VEHICLE INCLUDING THE SAME

CROSS-REFERENCE TO RELATED APPLICATIONS

The present application claims priority to Korean Patent Application No. 10-2024-0089130, filed on Jul. 5, 2024, the entire contents of which is incorporated herein for all purposes by this reference.

TECHNICAL FIELD

The present disclosure relates to a structure for protecting a battery for a vehicle and the vehicle including the same.

BACKGROUND

An electric vehicle is released from various automobile manufacturing companies as a kind of a solution for reducing air pollution in terms of environment protection. In general, the electric vehicle refers to a vehicle that is driven by using electricity as a power source, i.e., a vehicle that obtains driving energy by rotating a motor with electricity accumulated in a battery.

However, the battery for the electric vehicle is more vulnerable to a fire caused by a damage than to an internal combustion engine for a vehicle and has a higher risk of a secondary damage. Thus, a structure for protecting the battery in the electric vehicle is being actively developed.

In particular, as the electric vehicle is developed, a vehicle with an auxiliary battery in addition to a main battery is recently released. That is, a demand for the structure for protecting the battery for the vehicle to protect both the main battery and the auxiliary battery is issued.

SUMMARY

An embodiment of the present disclosure can provide a structure for protecting a battery for a vehicle, which can effectively protect a battery of an electric vehicle including an auxiliary battery from a side collision by distributing a side load and simplifying a connection structure of an impact absorbing member, and a vehicle including the same.

Technical problems to be solved by an embodiment of the present disclosure are not necessarily limited to the aforementioned technical problems and solutions to unmentioned technical problems using an embodiment of the present disclosure can be understood by those skilled in the art to which the present disclosure belongs.

According to an embodiment of the present disclosure, a structure for protecting a battery for a vehicle can include: a pair of side sills each extending in a longitudinal direction of a vehicle body; and a floor assembly coupled between the pair of side sills, wherein the floor assembly includes a panel that forms a space for mounting a first battery; a first cross member coupled to the panel and having both ends coupled to the pair of side sills in a first direction; and a second cross member having both ends coupled to the pair of side sills in a second direction and spaced apart from the first cross member with the first battery therebetween.

In an embodiment, each of the pair of side sills may include a reinforcement material therein.

In an embodiment, the second direction may be a straight direction crossing the pair of side sills.

In an embodiment, both ends of the second cross member may be coupled to the pair of side sills within a thickness range in a height direction of the reinforcement material.

In an embodiment, the second cross member may be disposed between the space for mounting the first battery and a space for mounting a second battery, the two spaces arranged vertically.

In an embodiment, the second cross member may comprise at least one beam having a polygonal cross-sectional shape.

In an embodiment, the structure may further comprise a pair of brackets each coupling one end of the second cross member to one of the pair of side sills.

In an embodiment, the panel may have a cross-section of a trapezoidal shape.

In an embodiment, the first cross member may include: a body part disposed above the panel and extending in a width direction of the vehicle body; and a pair of extension parts extending from both ends of the body part to connect the body part to the pair of side sills.

In an embodiment, each of the pair of extension parts may include: a first edge coupled to the body part; a second edge coupled to the panel; and a third edge coupled to the pair of side sills.

In an embodiment, the third edge may be coupled together at a first position at which the panel and the pair of side sills are coupled.

In an embodiment, the third edge may be coupled at a second position different from the first position.

According to an embodiment of the present disclosure, a vehicle can include: a vehicle body; a first battery; a pair of side sills each extending in a longitudinal direction of the vehicle body; and a floor assembly coupled between the pair of side sills, wherein the floor assembly includes a panel that forms a space for mounting the first battery; a first cross member coupled to the panel and having both ends coupled to the pair of side sills in a first direction; and a second cross member having both ends coupled to the pair of side sills in a second direction and spaced apart from the first cross member with the first battery therebetween.

In an embodiment of the vehicle, each of the pair of side sills may comprise a reinforcement material therein.

In an embodiment of the vehicle, the second direction may be a straight direction crossing the pair of side sills.

In an embodiment of the vehicle, both ends of the second cross member may be coupled to the pair of side sills within a thickness range in a height direction of the reinforcement material.

In an embodiment of the vehicle, the first battery may be placed above the second cross member, and the vehicle may further comprise a second battery positioned below the second cross member.

In an embodiment of the vehicle, the second cross member may comprise at least one beam having a polygonal cross-sectional shape.

In an embodiment of the vehicle, the vehicle may further comprise a pair of brackets each coupling one end of the second cross member to one of the pair of side sills.

In an embodiment of the vehicle, the panel may have a cross-section of a trapezoidal shape.

BRIEF DESCRIPTION OF THE DRAWINGS

It may be understood that the appended drawings are not necessarily to scale, presenting a somewhat simplified representation of various features illustrative of the basic principles of example embodiments of the present disclosure.

The specific design features of an embodiment of the present disclosure, such as the example embodiments included herein, including, for example, specific dimensions, orientations, locations, and shapes can be determined in part by the particularly intended application and use environment.

In the figures, same reference numerals can refer to same or equivalent parts of example embodiments of the present disclosure throughout the several figures of the drawing.

FIG. 1 is a perspective view illustrating a structure for protecting a battery for a vehicle according to an embodiment of the present disclosure;

FIG. 2 is an exploded view illustrating a right side sill assembly according to an embodiment of the present disclosure;

FIG. 3 is an exploded view illustrating a floor assembly according to an embodiment of the present disclosure;

FIG. 4 is a cross-sectional view taken along line A-A' of FIG. 1, according to an embodiment of the present disclosure;

FIG. 5 is a cross-sectional view taken along the line B-B' of FIG. 1, according to an embodiment of the present disclosure;

FIG. 6 is an exploded view illustrating a first cross member according to an embodiment of the present disclosure;

FIG. 7 is a cross-section view illustrating a structure for protecting a battery for a vehicle according to an embodiment of the present disclosure;

FIG. 8 is a view illustrating a second cross member according to an embodiment of the present disclosure;

FIG. 9A is an enlarged cross-section view illustrating region E of FIG. 4, according to an embodiment of the present disclosure; and FIG. 9B is a cross-section view illustrating a case in which a structure for protecting a battery for a vehicle according to the related art receives a side load.

DETAILED DESCRIPTION OF ILLUSTRATIVE EMBODIMENTS

Figure 1:
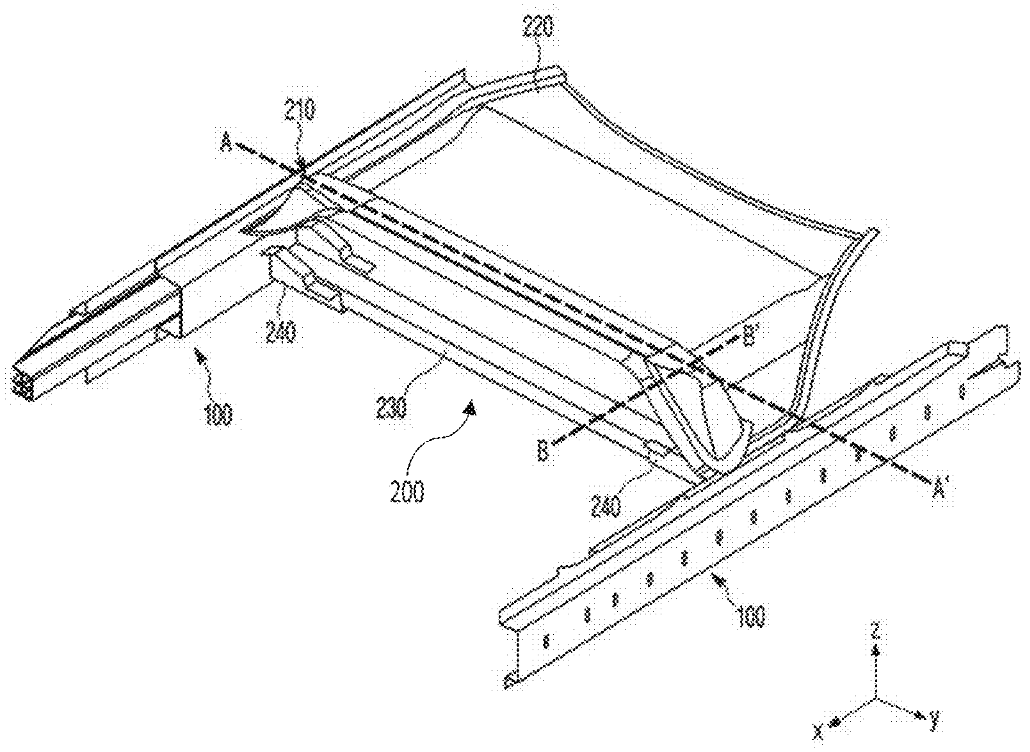

Hereinafter, example embodiments of the present disclosure will be described in detail with reference to the accompanying drawings in such a manner that technical ideas of the example embodiments of the present disclosure may easily be carried out by a person with ordinary skill in the art to which the disclosure pertains. The present disclosure may, however, be embodied in different forms and should not be construed as necessarily limited to the example embodiments set forth herein. In the following description of example embodiments of the present disclosure, a detailed description of known functions and configurations incorporated herein can be omitted to avoid making the subject matter of the present disclosure unclear and, in every possible case, like reference numerals can be used for referring to same or similar elements in the description and drawings.

In the following description, technical terms are used only for explaining a specific example embodiments while not necessarily limiting the present disclosure. Terms of a singular form may include plural forms unless referred to the contrary. The meaning of 'include' or 'comprise' specifies a property, a region, a fixed number, a step, a process, an element, and/or a component but does not exclude other properties, regions, fixed numbers, steps, processes, elements, and/or components.

Also, the terms " . . . unit", " . . . part", and the like that are disclosed in this specification can represent a unit for treating at least one function or operation.

It can be understood that although the terms of "first" and "second" are used herein to describe various elements, these elements are not necessarily limited by these terms. These terms may be used solely to differentiate one component from another in name, and their sequential meanings can be understood through the context of the description rather than by the names themselves.

The term "and/or" can be used to include all possible combinations of the listed items. For example, "A and/or B" includes all three cases of "A", "B", and "A and B".

It can be understood that when an element is referred to as being "connected to" or "engaged with" another element, it can be directly connected to the other element, or intervening elements may also be present.

Unless terms used in the present disclosure are defined differently, terms may be construed as known to those skilled in the art. Terms such as terms that are generally used and have been in dictionaries can be construed as having meanings matched with contextual meanings in the art. In this description, unless defined clearly, terms are not ideally, excessively construed as formal meanings.

Also, the terms unit, control unit, control device, or controller can be widely used to name devices that control specific functions and do not refer to a generic functional unit. Also, the devices denoted by such names may include a communication device that communicates with another controller or sensor to control the corresponding function, a computer-readable recording medium that stores an operation system, a logic command, and input/output information, and at least one processor that performs determinations, decisions, and calculations required for function control, for example.

Thus, the example embodiments of this detailed description are intended to be illustrative, but not necessarily limiting. It is intended that the scope of the present disclosure can be determined by the rational interpretation of the claims as set forth, and the modifications and variations of the present disclosure come within the scopes of the appended claims and their equivalents.

Hereinafter, example embodiments of the present disclosure will be described in detail with reference to FIGS. 1 to 9A.

FIG. 1 is a perspective view illustrating a structure for protecting a battery for a vehicle (hereinafter, referred to as a vehicle battery protection structure) according to an embodiment of the present disclosure. The vehicle battery protection structure according to the present disclosure can include a side sill assembly 100 and a floor assembly 200, and the floor assembly 200 is coupled between a pair of side sills.

Figure 2:
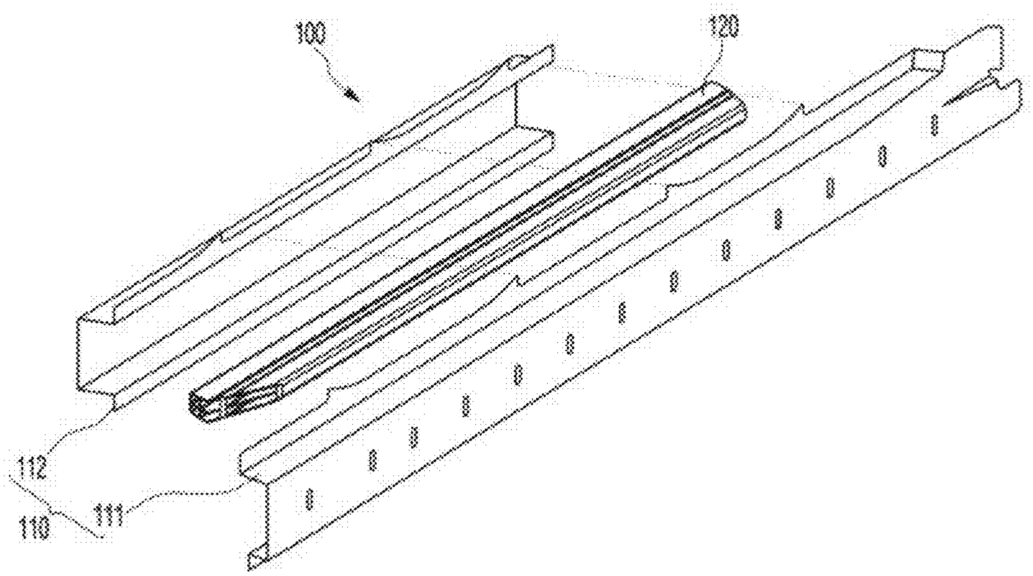
Figure 3:
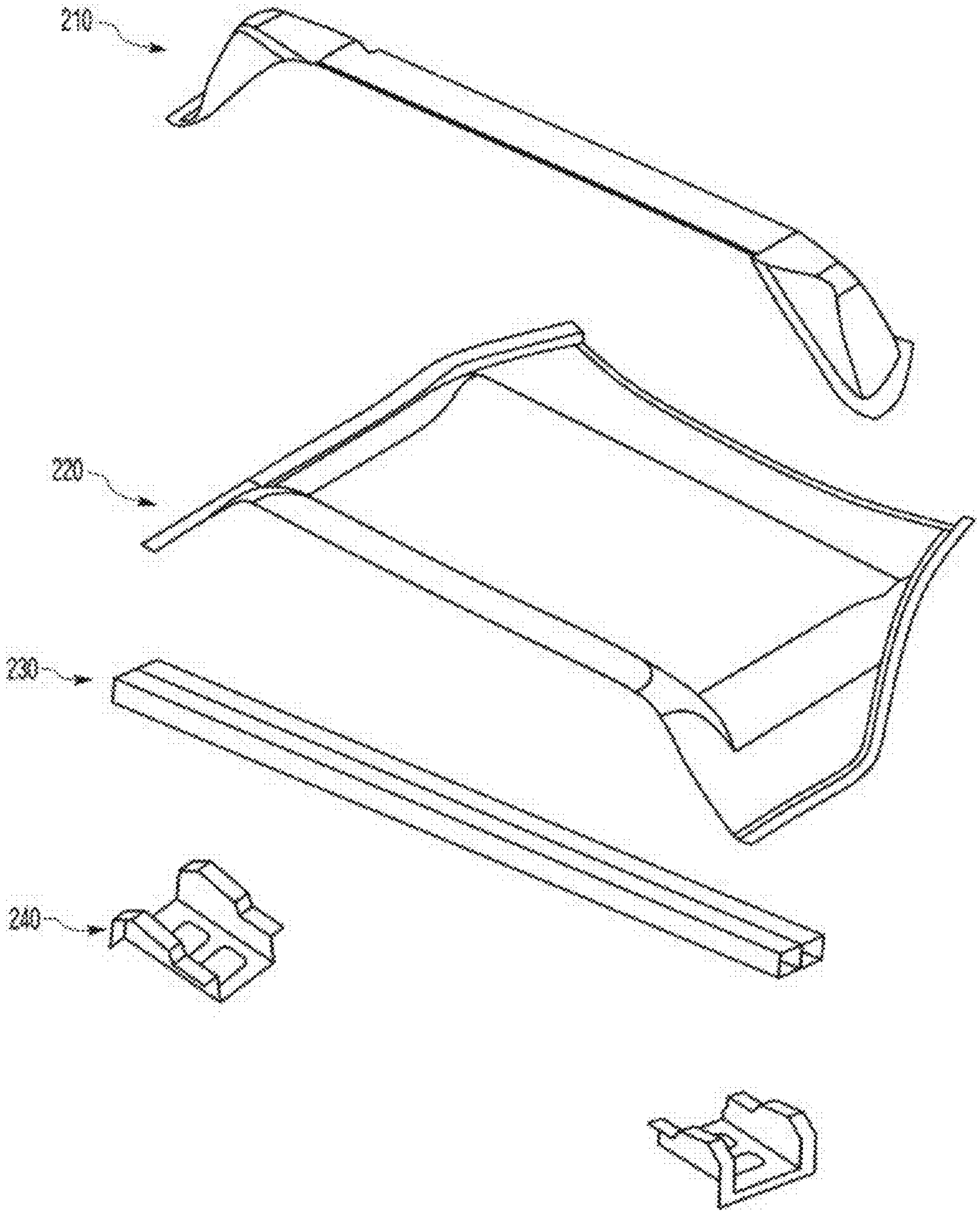

FIG. 2 is an exploded view illustrating the right side sill assembly 100. FIG. 3 is an exploded view illustrating the floor assembly 200. Because the pair of side sills have symmetrical shapes, only the right side sill of the pair of side sills 100 is illustrated in FIG. 2.

Referring to FIGS. 1-3, the side sill assembly 100 can include a pair of side sills 110 each extending in a longitudinal direction of a vehicle body and a reinforcement material 120 disposed in each of the side sills.

The pair of side sills 110 each can have a beam shape and may be integrated with each other or separated from each other as an inner panel 111 and an outer panel 112.

The reinforcement material including an extrusion and a bulkhead can be disposed in each of the pair of side sills 110. The reinforcement material primarily can absorb an impact load applied to the side sill 110.

A position at which the reinforcement material is coupled to the inside of the side sill will be described later.

The floor assembly 200 can be disposed between the pair of side sills 110 and coupled to each of the pair of side sills 110.

Figure 4:
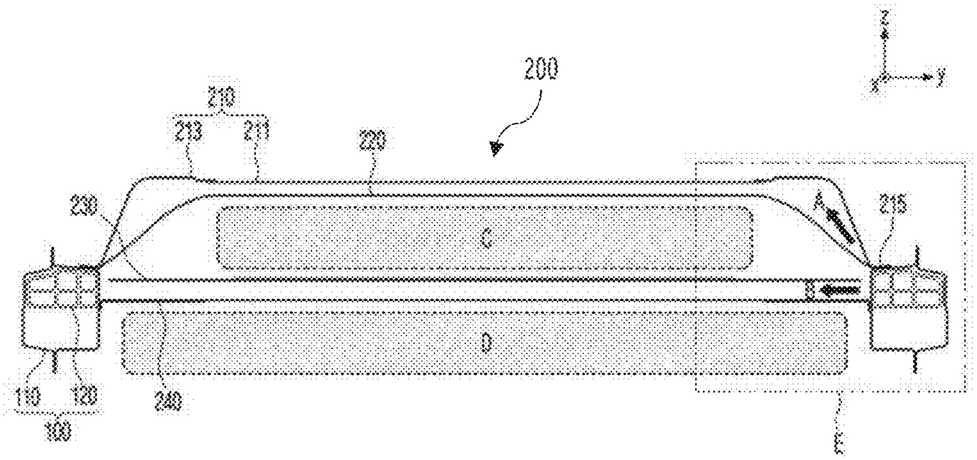
Figure 5:
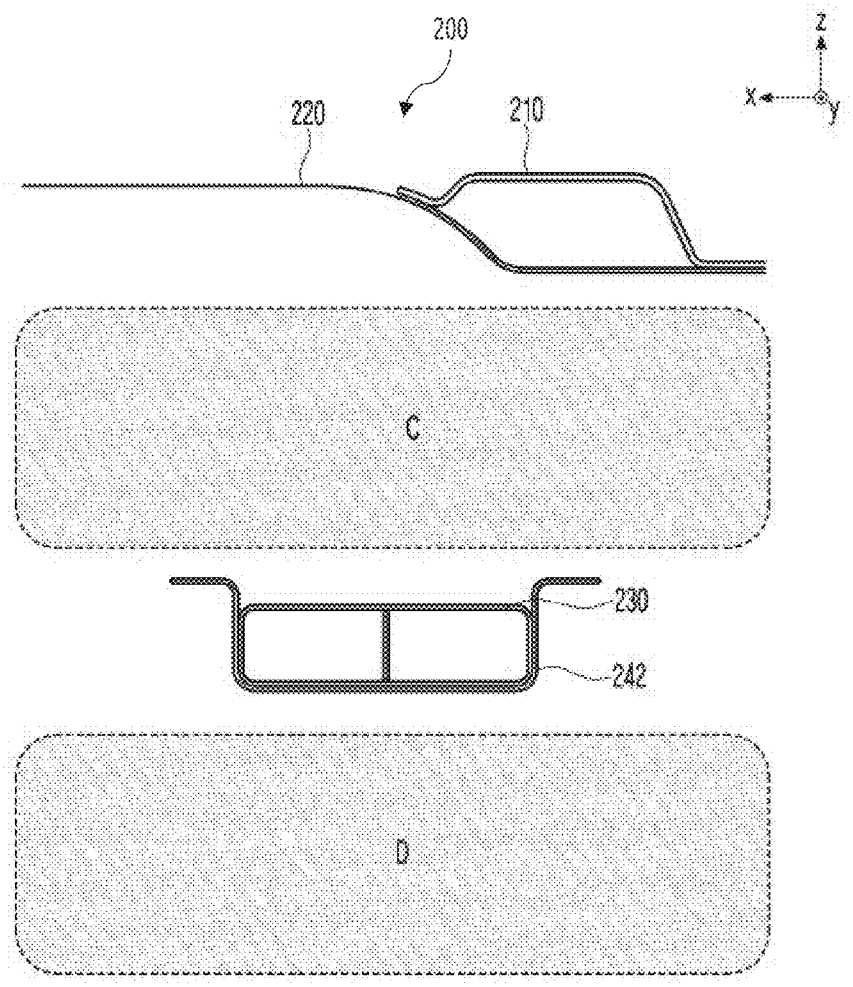

FIGS. 4 and 5 are cross-sectional views taken along line A-A' and B-B' of FIG. 1, respectively. Next, the floor assembly 200 and a connection relationship between the floor assembly 200 and the pair of side sills will be described in detail with reference to FIGS. 1 to 5.

The floor assembly 200 can include a first cross member 210, a panel 220, and a second cross member 230. Also, the floor assembly 200 may further include a pair of brackets 240.

Both ends of each of the first cross member 210 and the panel 220 may be coupled to the pair of side sills, respectively. The first cross member 210 and the panel 220 may be coupled to each other and coupled to the pair of side sills, respectively.

A space C for mounting a first battery can be formed in a portion of a bottom surface of the panel 220. Thus, a cross-section (yz plane) obtained by cutting the panel 220 parallel to a front surface of the vehicle body may have a trapezoidal shape without a bottom side. However, this is merely an example. An embodiment of the present disclosure is not necessarily limited to the cross-sectional shape of the panel 220 as long as the panel 220 forms the space for accommodating the first battery. Here, the first battery may be a main battery or an auxiliary battery.

A portion of an edge of the panel 220 can have a corresponding shape to be coupled with a frame of the vehicle body, and another portion thereof can have a shape corresponding to a coupled portion of the pair of side sills.

Because the first cross member 210 can be disposed above the panel 220 and coupled to the pair of side sills, a cross-section (yz plane) obtained by cutting a virtual plane parallel to the front surface of the vehicle body may have a trapezoidal shape without a bottom side, like the panel 220.

Figure 6:
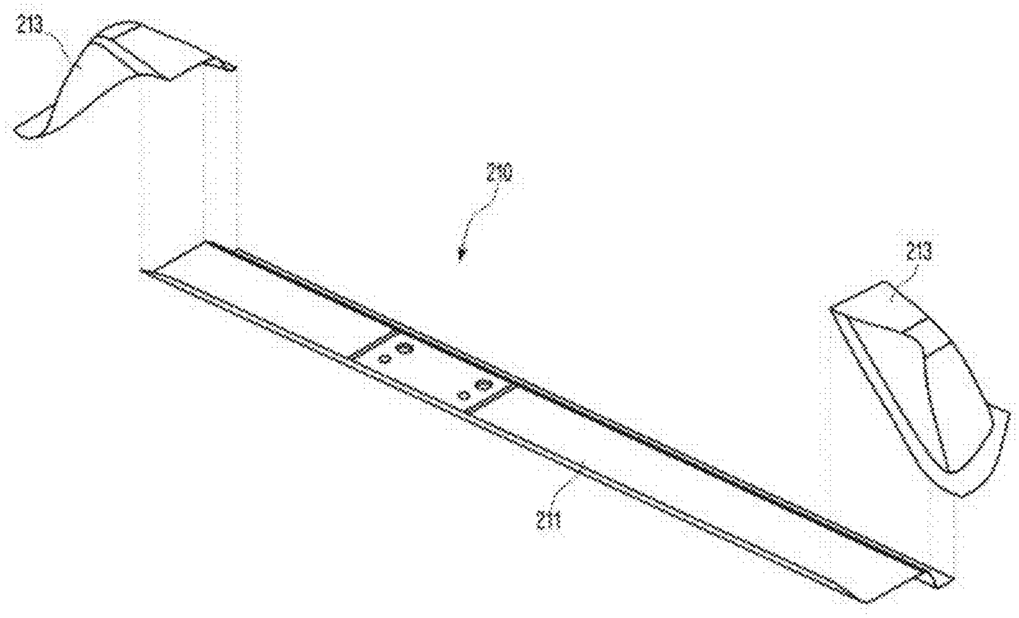

In particular, referring to FIG. 6, the first cross member 210 may include a body part 211 and a pair of extension parts 213. The body part 211 can extend in a width direction of the vehicle body to resist a side load, and a pair of extension parts 213 can be coupled to both ends of the body part 211 to connect the body part 211 to the pair of side sills 100.

Although the body part 211 and the pair of extension parts 213 may be separated from each other as described above, the body part 211 and the pair of extension parts 213 may be also integrated with each other.

Because an edge of the body part 211 in an x-axis direction can have a corresponding shape to be coupled with the panel 220, and edges of the pair of extension parts 213 can be coupled to the body part 211, the panel 220, and the pair of side sills 100, the edges of the pair of extension parts 213 may include: a first edge having a shape in contact with the body part 211; a second edge having a shape in contact with the panel 220; and a third edge having a shape in contact with the pair of side sills 100.

Figure 7:
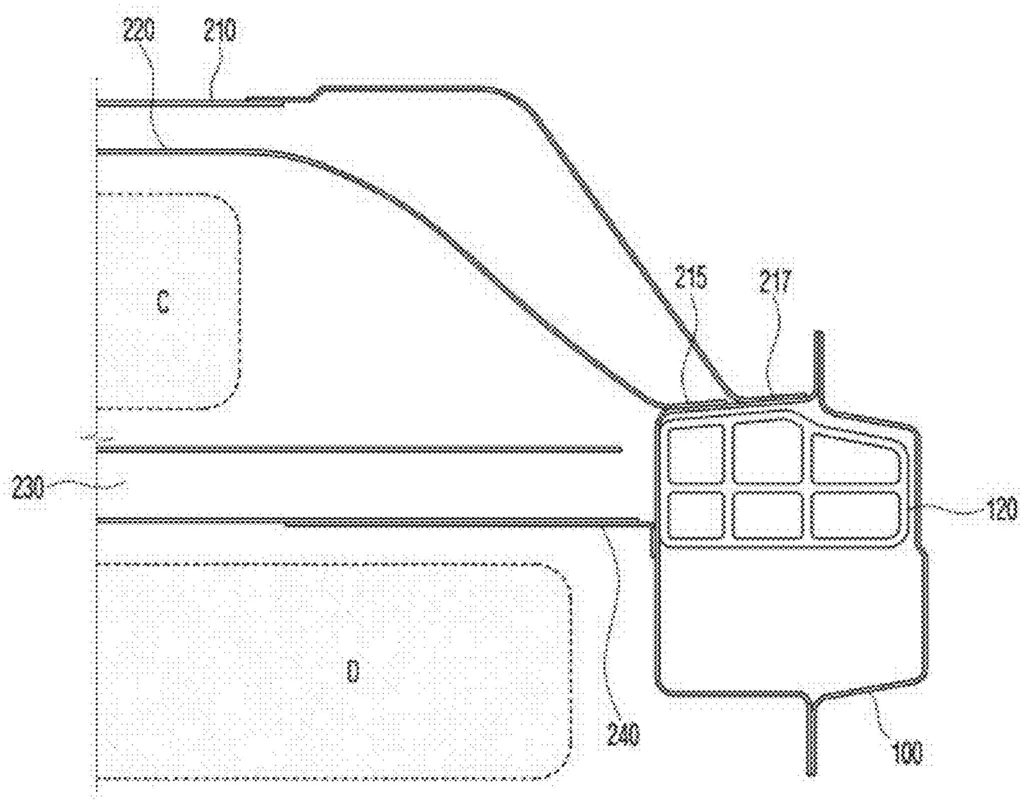

In particular, the third edge that is coupled to the pair of side sills 100 may be coupled together at a first coupled portion 215 at which the panel 220 is coupled with the pair of side sills 100, or, as in another embodiment of the present disclosure in FIG. 7 for example, can be coupled to the pair of side sills 100 instead of the panel 220 at a different position 217 other than the first coupled portion 215.

The second cross member 230 may be disposed below the space C for mounting the first battery, and a space D for mounting the second battery may be formed below the second battery. That is, the second cross member 230 may be disposed between the space C for mounting the first battery and the space D for mounting the second battery. Here, the first battery or the second battery may be a main battery or an auxiliary battery, and vice versa.

The second cross member 230 may be directly connected to the pair of side sills 100 or indirectly connected to the pair of side sills 100 through the pair of brackets 240.

Figure 8:
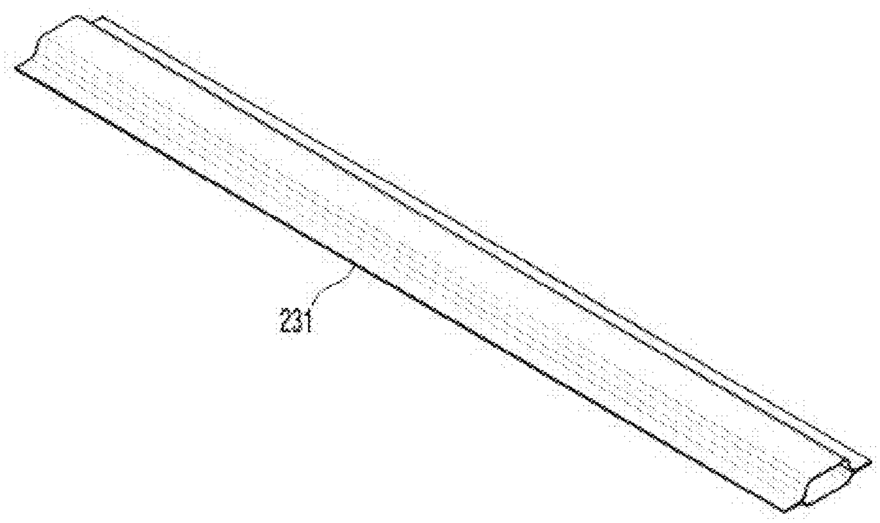

As illustrated in FIGS. 3 and 8, the second cross member 230 may include at least one beam 231 having a polygonal cross-section. For example, the second cross member 230 may include a beam having a rectangular cross-section or two or more beams each having a rectangular cross-section. Thus, a direction in which the second cross member 230 is coupled to the pair of side sills 100 may be a direction of connecting the pair of brackets 240 in a straight line.

As a result, the floor assembly 200 may be connected to the pair of side sills 100 through a first axis formed by the panel 220 and the first cross member 210 and a second axis formed by the second cross member 230 and the pair of brackets 240.

Referring to FIG. 4, the first axis may be coupled to the pair of side sills 100 in direction A, and the second axis may be coupled to the pair of side sills 100 in direction B.

In FIG. 4, according to the above-described example embodiment of the first and second cross members, an angle of the direction B based on the y-axis can be 0°, and an angle of the direction A can be greater than the angle of the direction B (e.g., about 60°). A case in which a coupled angle of the second axis (i.e., the angle of the direction B) is 0° can be most desirable because resistance to a side load parallel to the Y-axis can have a highest value, and a space for mounting the second battery below the second axis can be advantageously secured. However, an embodiment of the present disclosure is not necessarily limited thereto. For example, when the side load may be distributed with the first axis and the space for mounting the second battery may be formed, the angle of the direction B may be greater than 0°, like the first axis.

Figure 9A:
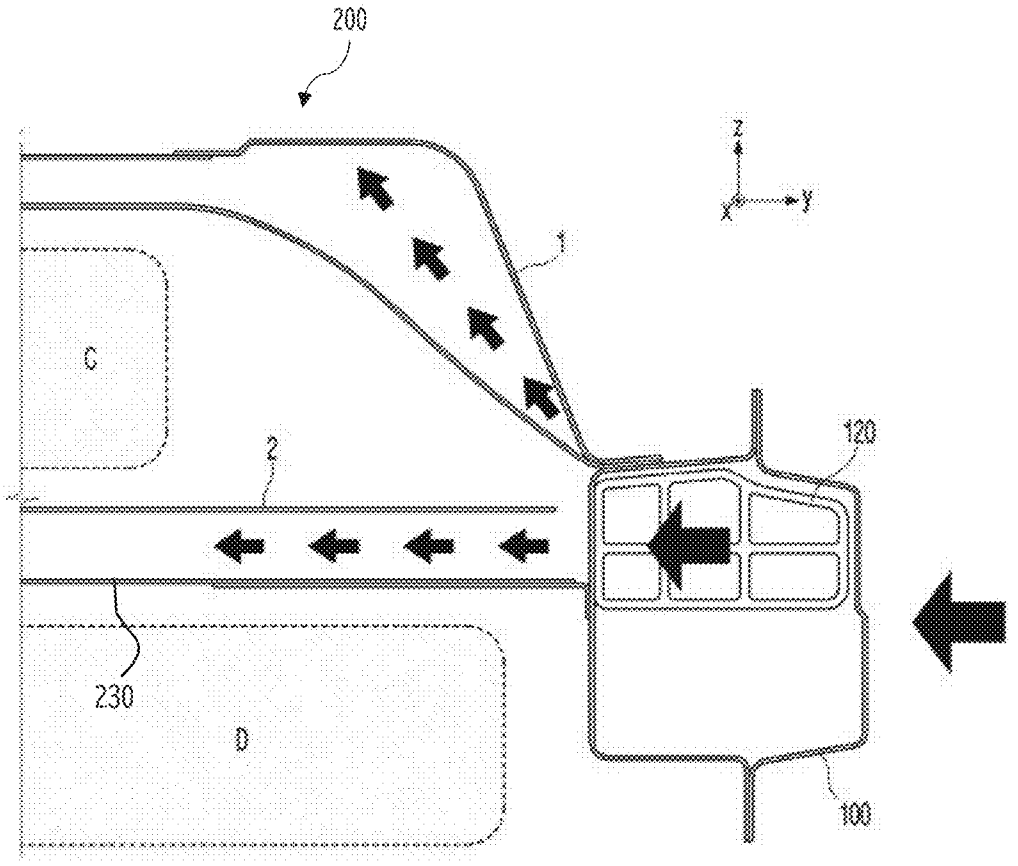

FIG. 9A is an enlarged cross-section view illustrating region E of FIG. 4. FIG. 9A illustrates a case in which the vehicle battery protection structure according to an embodiment of the present disclosure can receive the side load. Referring to FIG. 9A together, when a side collision, i.e., the side load, is applied to the side sill 100, a block of inner reinforcement material 120 can absorb an impact together with the side sill.

Thereafter, the first axis 1 and the second axis 2 can distribute the side load applied to the side sill as illustrated. The distribution of the side load may allow the vehicle to withstand a greater side load and reduce deformation of the vehicle body.

As the angle of the coupled direction of the first axis can be set to be greater than zero, the first axis may also absorb an impact of a z-axis component of the side load.

On the other hand, a position at which the second cross member 230 can be coupled to the pair of side sills 100 may be within a thickness range in a height direction of the reinforcement material 120. This can be for directly transferring a load remained after being absorbed by the reinforcement material 120 to the second cross member 230. Thus, when the second cross member 230 is coupled to an upper portion of the inner panel 111 of the side sill, a position of the reinforcement material in the side sill 100 may also be at a height similar to that of a cross-section of the second cross member 230.

Figure 9B:
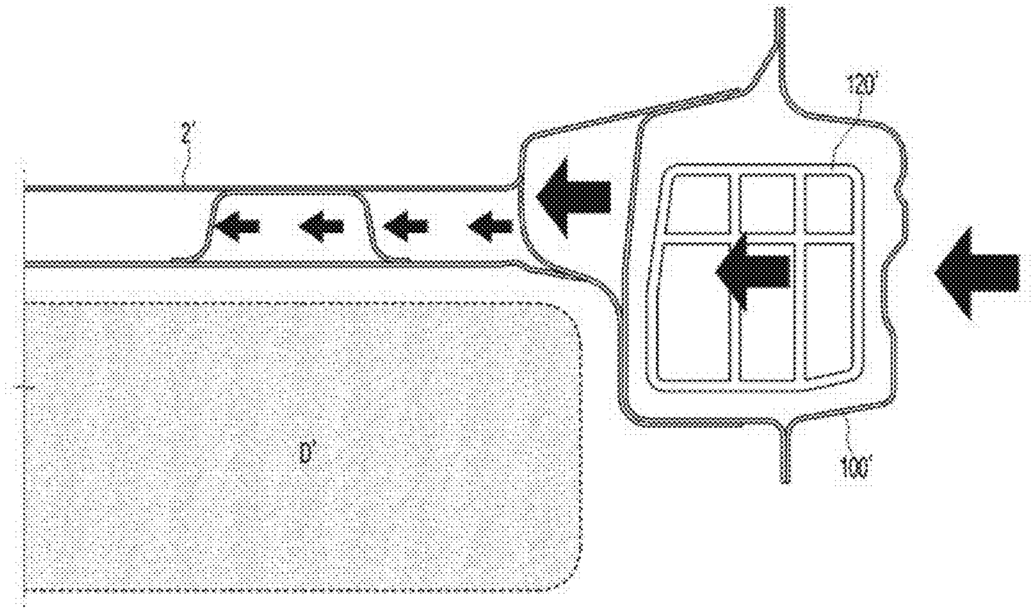

FIG. 9B is a view illustrating a case in which a vehicle battery protection structure according to the related art receives a side load in correspondence to FIG. 9A. In FIG. 9B, the vehicle battery protection structure according to the related art, as with the present disclosure, includes: a side sill 100', a reinforcement material 120' in the side sill, a cross member 2' (corresponding to the second axis 2 of the present disclosure) coupled to the side sill, and a connection part connecting the cross member 2' and the side sill 100'.

Because respective connected members in the z-axis have different heights, positions in the z-axis direction to which a side collision load is applied to respective members are different to cause a deformation distribution in which deformations of the vehicle body can be not uniform. On the other hand, in an embodiment of the present disclosure, the side collision load applied to the side sill can be directly connected to the second axis 2 through the reinforcement material 120 by setting central points of cross-sections of respective members to have similar heights in the z-axis, i.e., by fixing the reinforcement material to a position similar to the height of the cross-section of the second cross member 230.

As described above, the vehicle battery protection structure according to at least one embodiment of the present disclosure may absorb impact energy when a side collision of an electric vehicle occurs to effectively protect the battery for the vehicle, thereby preventing a damage on the battery.

Also, an embodiment of the present disclosure may reduce a deformation of the vehicle body by distributing the side load and improve the connection structure of the members constituting the vehicle battery protection structure to prevent each of the members from being distorted when absorbing an impact, and particularly, to improve a side collision performance of the electric vehicle with the auxiliary battery mounted.

A vehicle according to an embodiment of the present disclosure may include a battery for a vehicle and a structure for protecting the battery for the vehicle. The structure for protecting the battery for the vehicle may include: a pair of side sills 100 extending in a longitudinal direction of a vehicle body; and a floor assembly 200 coupled between the pair of side sills. As described above for example, the floor assembly 200 may include: a panel that forms a space for mounting a first battery; a first cross member coupled to the panel and having both ends coupled to the pair of side sills in a first direction; and a second cross member having both ends coupled to the pair of side sills in a second direction and spaced apart from the first cross member with the first battery therebetween.

The above-described structure for protecting the battery for the vehicle according to at least one embodiment of the present disclosure may absorb the collision energy when the side collision of the electric vehicle occurs to effectively protect the battery for the vehicle and prevent the battery from being damaged.

Also, an embodiment of the present disclosure may distribute the side load to reduce the deformation of the vehicle body and improve the connection structure of the members constituting the structure for protecting the battery for the vehicle to prevent respective members from being distorted, particularly, to improve further the side collision performance of the electric vehicle with the auxiliary battery mounted.

The advantages of an embodiment of the present disclosure are not necessarily limited to the aforesaid, and other advantages not described herein can be understood by those skilled in the art from descriptions herein.

What is claimed is:

1. A structure for protecting a battery for a vehicle, the structure comprising:
- a pair of side sills each extending in a longitudinal direction of a vehicle body; and
- a floor assembly coupled between the pair of side sills, wherein the floor assembly comprises:
  - a panel that forms a first space for mounting a first battery,
  - a first cross member coupled to the panel and having both first-cross-member ends coupled to the pair of side sills, respectively, in a first direction, and
  - a second cross member having both second-cross-member ends coupled to the pair of side sills, respectively, in a second direction and spaced apart from the first cross member with the first space for mounting the first battery therebetween.

2. The structure of claim 1, wherein each of the pair of side sills comprises a reinforcement material therein.

3. The structure of claim 2, wherein the second direction is a straight direction crossing the pair of side sills.

4. The structure of claim 3, wherein both of the second-cross-member ends of the second cross member are coupled to the pair of side sills, respectively, within a thickness range in a height direction of the reinforcement material.

5. The structure of claim 1, wherein the second cross member is disposed between the first space for mounting the first battery and a second space for mounting a second battery, wherein the first space and the second space are arranged vertically relative to each other.

6. The structure of claim 1, wherein the second cross member comprises at least one beam having a polygonal cross-sectional shape.

7. The structure of claim 1, further comprising a pair of brackets each coupling each of the second-cross-member ends of the second cross member to each of the pair of side sills, respectively.

8. The structure of claim 1, wherein the panel has a cross-section of a trapezoidal shape.

9. The structure of claim 8, wherein the first cross member comprises:
- a body part disposed above the panel and extending in a width direction of the vehicle body; and
- a pair of extension parts extending from both body-part ends of the body part to connect the body part to the pair of side sills, respectively.

10. The structure of claim 9, wherein each of the pair of extension parts comprises:
- a first edge coupled to the body part;
- a second edge coupled to the panel; and
- a third edge coupled to a respective one of the pair of side sills.

11. The structure of claim 10, wherein the third edge is coupled together at a first position at which the panel and the respective one of the pair of side sills are coupled.

12. The structure of claim 11, wherein the third edge is coupled at a second position different from the first position.

13. A vehicle comprising:
- a vehicle body;
- a first battery;
- a pair of side sills each extending in a longitudinal direction of the vehicle body; and
- a floor assembly coupled between the pair of side sills, wherein the floor assembly comprises:
  - a panel that forms a first space for mounting the first battery;

a first cross member coupled to the panel and having both first-cross-member ends coupled to the pair of side sills, respectively, in a first direction; and a second cross member having both second-cross-member ends coupled to the pair of side sills, respectively, in a second direction and spaced apart from the first cross member with the first battery therebetween.

14. The vehicle of claim 13, wherein each of the pair of side sills comprises a reinforcement material therein.

15. The vehicle of claim 14, wherein the second direction is a straight direction crossing the pair of side sills.

16. The vehicle of claim 15, wherein both of the second-cross-member ends of the second cross member are coupled to the pair of side sills, respectively, within a thickness range in a height direction of the reinforcement material.

17. The vehicle of claim 13, wherein the first battery is placed above the second cross member, and wherein the vehicle further comprises a second battery positioned below the second cross member.

18. The vehicle of claim 13, wherein the second cross member comprises at least one beam having a polygonal cross-sectional shape.

19. The vehicle of claim 13, further comprising a pair of brackets each coupling each of the second-cross-member ends of the second cross member to each of the pair of side sills, respectively.

20. A vehicle comprising:

a vehicle body;

a first battery;

a second battery;

a pair of side sills each extending in a longitudinal direction of the vehicle body, wherein each of the pair of side sills comprises a reinforcement block therein, wherein the reinforcement block comprises an energy absorbing reinforcement material, and wherein the reinforcement block has a vertical height; and a floor assembly coupled between the pair of side sills, wherein the floor assembly comprises:

a panel that forms a first space for mounting the first battery, a first cross member coupled to the panel and having both first-cross-member ends thereof coupled to the pair of side sills, respectively, in a first direction, and a second cross member having both second-cross-member ends thereof coupled to the pair of side sills, respectively, in a second direction and vertically spaced apart from the first cross member with the first battery therebetween, wherein the second battery is positioned below the second cross member, such that the second cross member extends between the first battery and the second battery, wherein the first direction is different than the second direction, and wherein both of the second-cross-member ends of the second cross member are coupled to the pair of side sills, respectively, at a vertical position aligned with the reinforcement block within a thickness range in the vertical height of the reinforcement block.

* * * * *